United States Patent [19]

Matsumoto et al.

[11] Patent Number: 4,740,953
[45] Date of Patent: Apr. 26, 1988

[54] TIME DIVISION SPEECH PATH SWITCH

[75] Inventors: Jun Matsumoto, Tokyo; Hiromichi Mori, Kanagawa, both of Japan

[73] Assignee: Kokusai Denshin Denwa Co., Ltd., Tokyo, Japan

[21] Appl. No.: 860,396

[22] Filed: May 7, 1986

[30] Foreign Application Priority Data

May 24, 1985 [JP] Japan ................................ 60-110105

[51] Int. Cl.⁴ ............................................ H04Q 11/04
[52] U.S. Cl. ......................................... 370/58; 370/66; 370/68
[58] Field of Search ............................. 370/58, 66, 68

[56] References Cited

U.S. PATENT DOCUMENTS

| | | | |
|---|---|---|---|
| 4,392,224 | 7/1983 | Mori et al. | 370/68 |
| 4,450,557 | 5/1984 | Munter | 370/58 |
| 4,470,139 | 9/1984 | Munter | 370/66 |
| 4,500,986 | 2/1985 | Carver | 370/58 |

Primary Examiner—Douglas W. Olms
Assistant Examiner—Min Jung

Attorney, Agent, or Firm—Armstrong, Nikaido, Marmelstein & Kubovcik

[57] ABSTRACT

A time division speech path switch for an electronic exchange system has a plurality of speech path memories for each input highway, and an input highway information is stored simultaneously in all of said speech path memories. The number of said input highway memories is equal to number of output highways, and each speech path memory can store at least one frame information of an input highway. A holding memory is provided at each output highway. A switched output signal is read out of one of said speech path memories according to content of the holding memory coupled with the output highway. According to the invention which has a plurality of input speech path memories and a plurality of holding memories, instead of a single speech path memory and a single holding memory of a prior art, an operational speed of a speech path memory and a holding memory may be slow as compared with that of a prior art. And, a large capacity of exchange system may be designed by using a low speed memory device.

4 Claims, 5 Drawing Sheets

Fig. 1 *PRIOR ART*

TIME DIVISION SPEECH PATH SWITCH

BACKGROUND OF THE INVENTION

The invention is concerned with the structure of a time division speech path switch which is used in a time division exchange system. (It will be called "C switch" in the description which follows.) Due to its facilities of both highway switching and time switching, any one of nk number of speech paths provided by k number of input highways, each having n number of multiplexing speech paths, can be connected without blocking to any one of nk number of speech paths included in k output highways, each having n number of multiplexing speech paths, in an arbitrary combination.

The structure of a C switch shown in FIG. 1 has been well known. In FIG. 1, the numeral 1 stands for a speech path memory, 2 stands for a holding memory. Each of the memories has a capacity of nk words for storing nk speech paths. A counter denoted by 3 is able to count from 0 to nk−1 and circulates with a clock whose period is 1/nk. (The frame period of time division multiplexing is chosen as a unit time.) A multiplexer circuit, denoted by 4, multiplexes the speech paths provided k input highways 6-1, 6-2, --- 6-k, onto a single input secondary high way denoted by 8. A demultiplexer circuit 5 distributes the speech path provided by a single output secondary highway, denoted by 9, to k output highways 7-1, 7-2, --- 7-k. Counter 3 is synchronously operated with the multiple frame frequency of the input secondary highway 8. That is, when a signal of i'th speech path is coming into input secondary highway 8, counter 3 indicates i. with this as an address, the signal is written into a word of speech path memory 1 whose address is given by i. At the same time, a word, whose address is i, of holding memory 2 is read out and the content j is obtained. Then, a word with address j of speech path memory 1 is read out, and the read out information is sent out on the output secondary highway 9 as a signal in its i'th speech path. Meanwhile, a word with address j of holding memory 2 contains i (not shown in FIG. 1). When counter 3 indicates j, in the same way as explained above, a signal of j'th speech path of input secondary highway 8 is written into a word with address j of speech path memory 1, and the content stored in a word with address i of speech path memory 1 is read out and sent to output secondary highway 9 as a signal in its j'th speech path. In this way, signals are exchanged between input secondary highway 8 and output secondary highway 9 concerning their i'th and j'th speech paths. There is a one-to-one correspondence between the speech paths of input secondary highway 8 and those of input highways 6-1, 6-2, --- 6-k. The same is true also between the speech paths of output secondary highway 9 and those of output highways 7-1, 7-2, --- 7-k. The fact that any two speech paths can be exchanged between input secondary highway 8 and output secondary highway 9 means that any exchange can be realized between speech paths of all the input highways and those of all the output highways.

The well known C switch structure described above, however, has a drawback that it requires very high speed memory circuitry for both speech path memory 1 and holding memory 2. That is, as is obvious from the above explanation, speech path memory 1 must be accessed 2nk times for read-in and read-out during one frame period of time division multiplexing (for example, 125 μs. in a PCM system) and holding memory 2 must be accessed nk times per frame period for read-out. This means the maximum speed of a memory element determines the capacity (=number of speech paths, i.e., nk) of a C switch of this type. In other work, the capacity of a C switch is limited by the operational speed of a memory.

SUMMARY OF THE INVENTION

It is an object, therefore, of the present invention to overcome the disadvantages and limitations of a prior time division speech path switch by providing a new and improved speech path switch.

It is also an object of the present invention to provide a time division speech path switch which may have a large capacity that is not limited by the operational speed of memory circuitry.

The above and other objects are attained by a time division speech path switch in which any speech path, in a plurality of input highways, can be connected to any desired speech path, in a plurality of output highways, without blocking the invention comprises a speech path memory group having a plurality of speech path memories corresponding to each output highways. The speech path memory group is provided for each input highway. The number of the speech path memories are equal to the number of corresponding output highways. Each of said speech path memory has the capacity to store at least one frame of information for an input highway. A holding memory is provided at each output highway. The holding memory stores information concerning the speech path on an input highway to be read out onto a speech path of an output highway to which the holding memory is coupled. An input highway information is stored simultaneously in all of the speech path memories in the speech path memory group. A switched output signal is read out of one of the speech path memories, according to content of said holding memory.

BRIEF DESCRIPTION OF THE DRAWINGS

The foregoing and other objects, features, and attendant advantages of the present invention will be better understood by means of the following description and accompanying drawings wherein.

DESCRIPTION OF THE PREFERRED EMBODIMENTS

Figure 2:
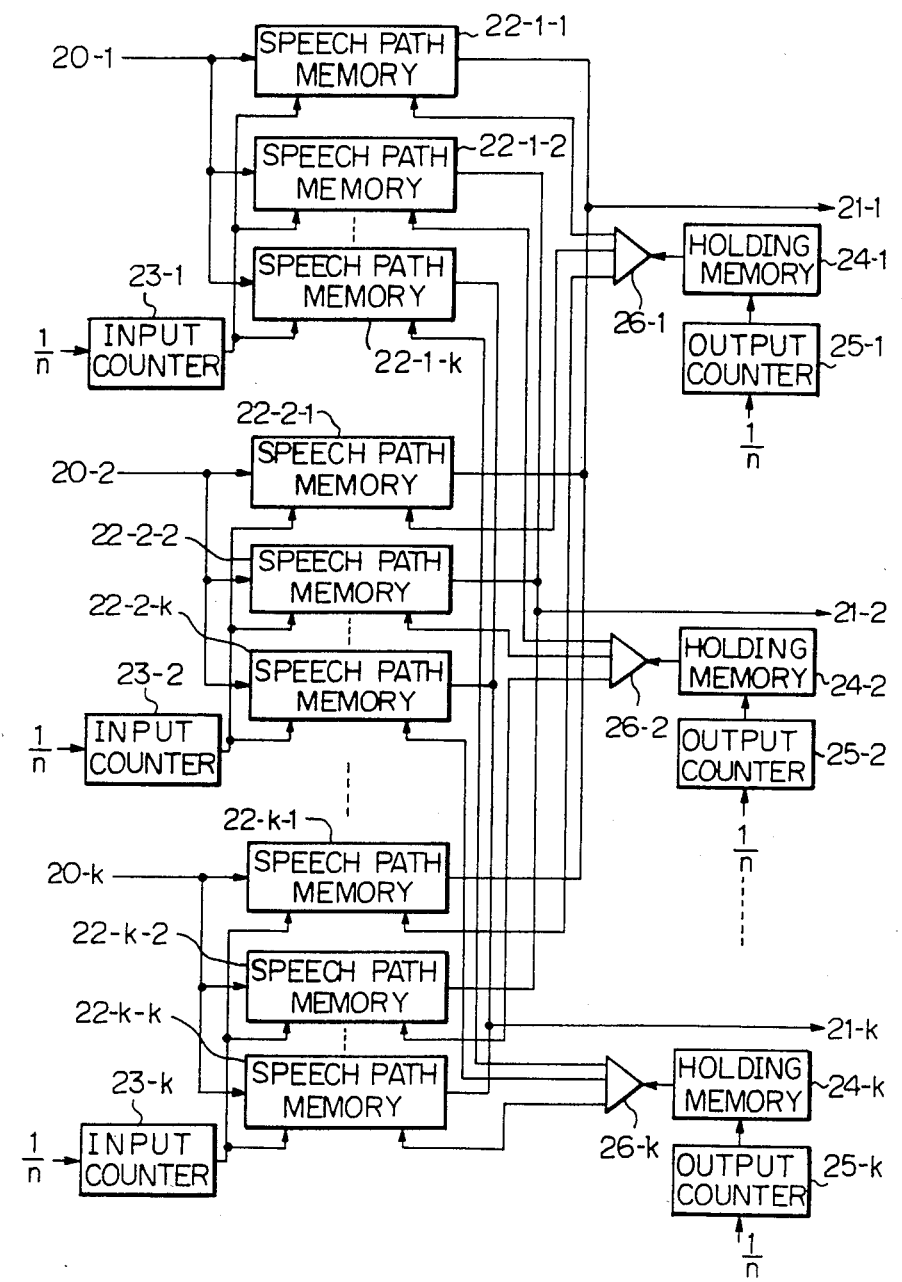
FIG. 2 is a block diagram of a time division speech path switch according to the present invention.

FIG. 2 shows an embodiment of the invention. In FIG. 2, each of 20-1, 20-2, --- 20-k stands for an input highway. Each of 22-1-1, 22-1-2, --- 22-1-k, 22-2-1, 22-2-2, --- 22-2-k, ---, 22-k-1, 22-k-2, --- 22-k-k stands for a speech path memory that has a memory capacity of n words for storing the n speech paths of the time division multiplexing in an input highway. In this structure each of the k speech path memories is grouped. The number k is the same as the number of output highways. Each speech path memory has the same memory capacity. Each of 23-1, 23-2, --- 23-k stands for an input counter that counts a clock with a period of 1/n and circulates from 0 to n−1 synchronously with the frame phase of the associated input highway. Speech path information appearing on an input highway is written into its speech path memories as follows. Take input highway 20-1 as an example. Each piece of speech path information of input highway 20-1 is sent to its k speech path memories 22-1-1, 22-1-2, --- 22-1-k simultaneously and it is written respectively at a common address indicated by the content of input counter 23-1. This process of writing is quite the same for the rest of input highways 20-2, --- 20-k. Thus a word having the same address in each of the k speech path memories of an input higway contains the same contents.

Figure 3:
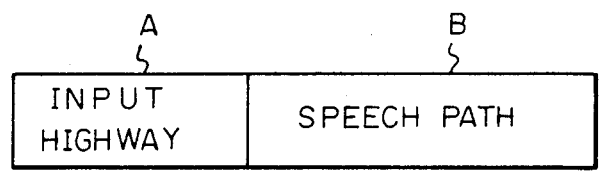
FIG. 3 shows structure of a word of a holding memory.

Each of 24-1, 24-2, --- 24-k stands for a holding memory. Each of 25-1, 25-1, --- 25-k stands for an output counter. Each of 26-1, 26-2, --- 26-k stands for a distribution circuit. Each of output highways 21-1, 21-1, --- 21-k is equipped with a holding memory, an output counter and a distribution circuit individually. Each output counter, with a clock having a period of 1/n, circulates from 0 to n−1 independently of one another. The value, that each output counter indicates, is a speech path number to be sent out on the associated output highway. Each work of any of holding memories 24-1, 24-2, --- 24-k corresponds to each speech path of the associated output highway. The contents comprises information A that indicates an input highway, and information B that indicates a speech path of the input highway as shown in FIG. 3.

As an example, the output operation from speech path group 22-1-1, 22-2-1, --- 22-k-1 to output highway 21-1 will be explained. Output operations to other output highways 21-2, --- 21-k are the same.

Figure 1:
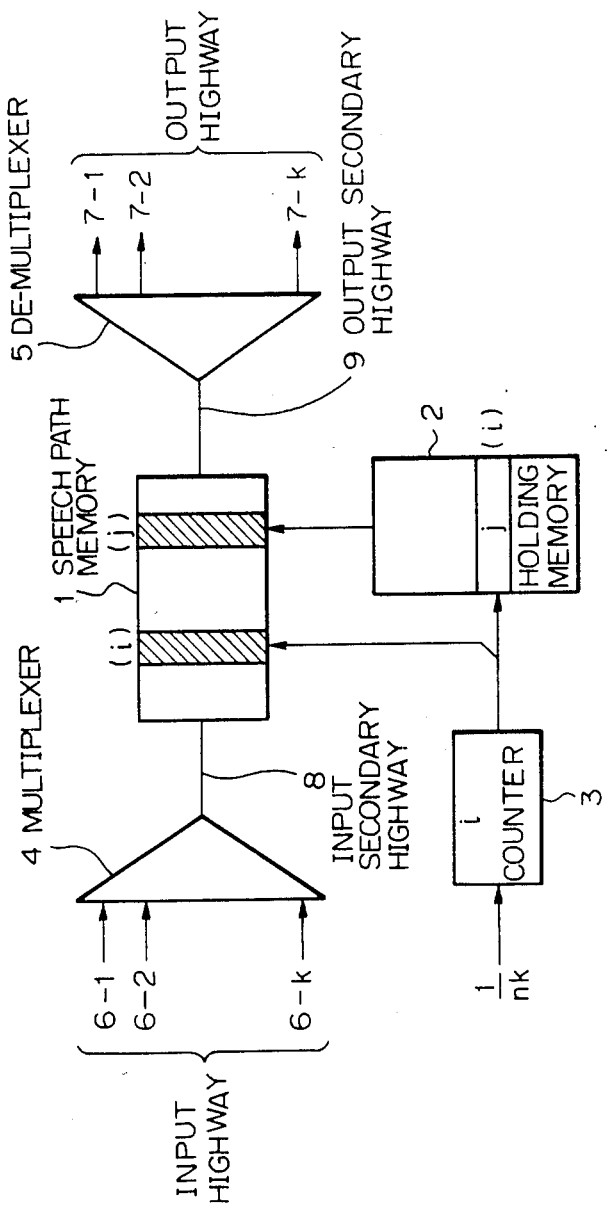
FIG. 1 is a block diagram of a prior time division speech path switch.

First, the contents of output counter 25-1 is sent to holding memory 24-1 as an address. The contents of a work having the address of holding memory 24-1 is read out and is sent to the distribution circuit 26-1. Upon receiving it, the distribution circuit 26-1 tests its input highway indication information, i.e., A, and selects one of the speech path memories 22-1-1, 22-2-1, --- 22-k-1 that is specified by A and sends B, the speech path indication information, to it. For example, when the value of A is 2, B is sent to speech path memory 22-2-1 and the content of a word whose address is B of speech path memory 22-2-1 is read out to output highway 21-1. Each piece of speech path information coming to an input highway is written one by one into its speech path memories at an address indicated by its input counter. An output highway receives each piece of speech path information read out from a speech path memory at an address indicated by means of its holding memory. This means a speech path of an input highway is transfered to a speech path of an output highway using the same principle as that of the C switch shown in FIG. 1.

In the structure shown in FIG. 2 of this invention, each of input highways 20-1, 20-2, --- 20-k is each equipped with speech path memory groups 22-1-1, 22-1-2, 22-1-k; 22-2-1, 22-2-2, --- 22-2-k; --- 22-k-1, 22-k-2, --- 22-k-k. Each piece of speech path information appearing on an input highway is stored simultaneously into its k speech path memories with redundancy. Therefore, it is obvious that any speech path of an input highway can be connected without blocking any speech path of an output highway and this switch of FIG. 2 is equal to the conventional C switch shown in FIG. 1 from a switching capability point of view. in the structure shown in FIG. 1, however, the speech path memory must be accessed 2nk times for read-in and read-out per frame period of time division multiplexing, and the holding memory must be accessed nk times for read-out during the same period of time. In the structure shown in FIG. 2 of this invention, each speech path memory is required to be accessed 2n times per frame period for read-in and read-out and each holding memory is required to be accessed n times per frame period for read-out. That is, the memory element's speed requirement is reduced by a factor of 1/k where k is the number of speech path memories that are connected to each of the input highways in parallel.

Figure 4A:
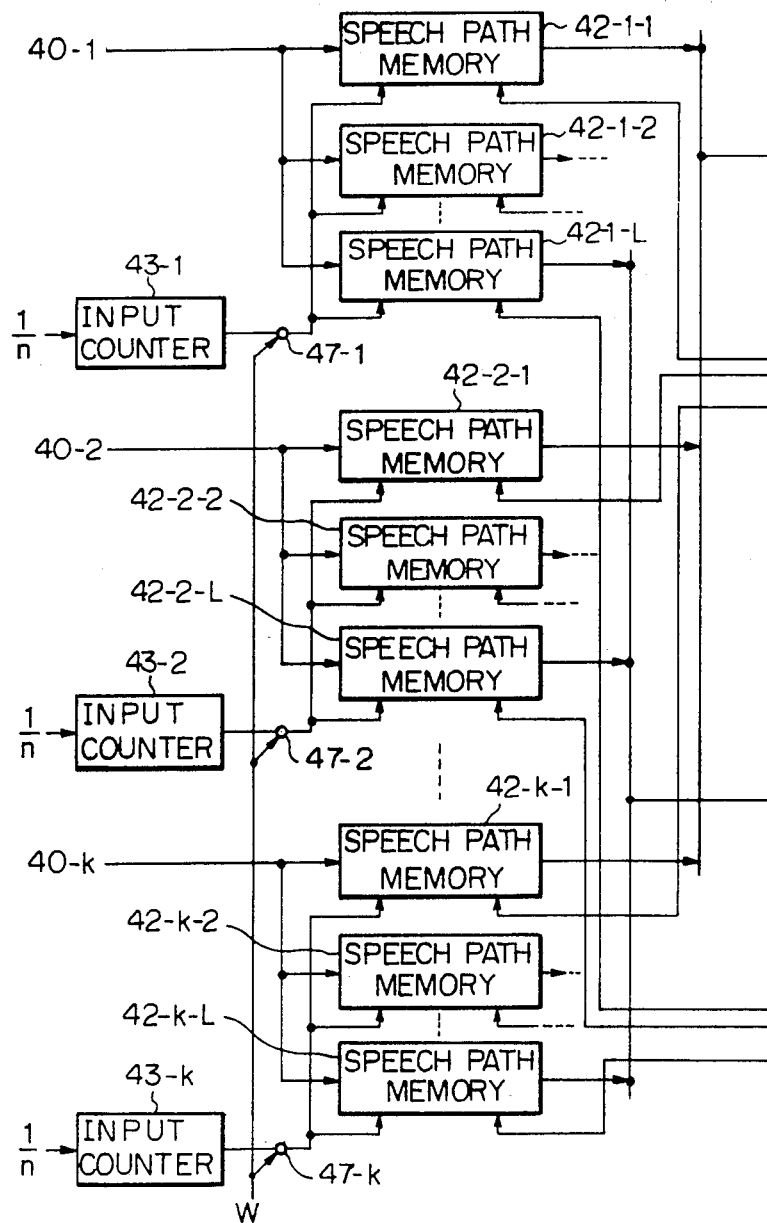
FIGS. 4A–4B are a block diagrams of another embodiment of a time division speech path switch according to the present invention.
Figure 4B:
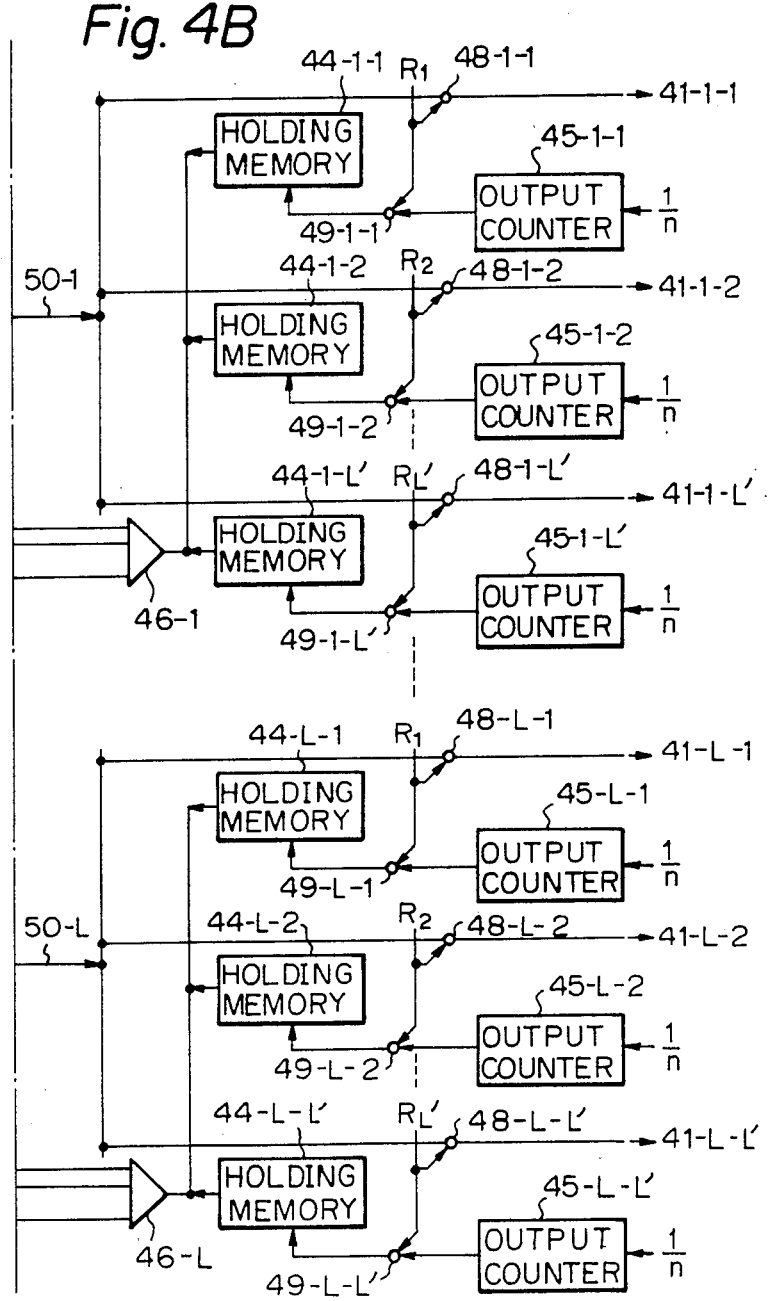

In the structure shown in FIG. 2, each input highway requires a number equal to the number of output highways (=k) of speech path memories. In order to reduce the number of speech path memories connected in parallel to an input highway, the following structure is effective. FIG. 4 shows a switch structure where all the output highways are divided into a number of groups and output highways belonging to a group share speech path memories in each speech path memory group. Let's explain the switching operation performed in the structure shown in FIG. 4 in detail.

Figure 5:
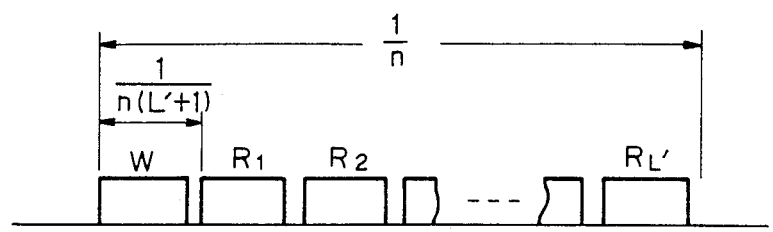
FIG. 5 is an operational time chart showing the operation of the apparatus of FIGS. 4A–4B.

In FIG. 4, each of 40-1, 40-2, --- 40-k stands for an input highway corresponding to each of 20-1, 20-2, --- 20-k shown in FIG. 2. Each of 41-1-1, 41-1-2, --- 41-1-L', --- 41-L-1, 41-L-2, --- 41-L-L', stands for an output highway corresponding to each of 21-1, 21-2, --- 21-k shown in FIG. 2. Here, all the output highways are divided into L groups, each of which contains L' output highways. That is LL'=k. Terminals denoted by W, $R_1$, $R_2$, --- $R_L$, respectively will be energized by a pulse according to the time chart shown in FIG. 5. First, consider the input operation which takes place in a period when terminal W is energized by a pulse.

Each of speech path memory groups 42-1-1, 42-1-2, --- 42-1-L; 42-2-1, 42-2-2, --- 42-2-L; --- 42-k-1, 42-k-2, --- 42-k-L which is connected to each of the input highways, corresponds to each fo the speech path memory groups 22-1-1, 22-1-2, --- 22-1-k; 22-2-1, 22-2-2, --- 22-2-k; --- 22-k-1, 22-k-2, --- 22-k-k, in FIG. 2. In FIG. 4, each speech path memory group connected to each input highway contains L speech path memories in place of k, where L is the number of all the output highway groups. Each speech path memory has a capacity of n words where n is the number of time division multiplexing speech paths of each input highway. Each of 43-1, 43-2, 43-k stands for an input counter that counts a clock having a period of 1/n, and is synchronous with the frame phase of its input highway and circulates from 0 to n−1. When terminal W is energized by a pulse, gate circuits 47-1, 47-2, --- 47-k open simultaneously and the contents of input counters 43-1, 43-2, --- 43-k are sent, as address information, to their speech path memory groups 42-1-1, 42-1-2, --- 42-1-L; 42-2-1, 42-2-2, --- 42-2-L; --- 42-k-1, 42-k-2, --- 42-k-L, and a piece of speech path information appearing on any of k input highway 40-1, 40-2, --- 40-k is written into, in parallel, its associated speech path memories at a common address sent from its input counter. The input operation explained above is carried out in the quite same way as that of the switch structure shown in FIG. 2.

The output operation will be explained where output highway group 41-1-1, 41-1-2, --- 41-1-L' is taken as an example. Explanation is quite the same for any other output highway group.

When terminals $R_1$, $R_2$, --- $R_L{}^1$, are energized by a pulse, the corresponding output highways 41-1-1, 41-1-2, --- 41-1-L' are in their output periods respectively. That is, the output operation is performed individually for each output highway. Each of 44-1-1, 44-1-2, --- 44-1-L' stands for a holding memory, each of 45-1-1, 45-1-2, --- 45-1-L' stands for an output counter. Each output highway is connected with a holding memory and an output counter individually. Each output counter, with a clock having a period of 1/n, circulates from 0 to n−1 independently of one another. The value of each output counter indicates a speech path number that is required by its output highway at that moment. Each work of each of holding memories 44-1-1, 44-1-2, --- 44-1-L' corresponds to each speech path of its output highway whose content comprises information A that indicates an input highway and information B that indicates a speech path of the input highway, as shown in FIG. 3.

As an example, an explanation of the operation will follow which takes place in an output period of output highway 41-1-1 when terminal $R_1$ is energized by a pulse. When terminal $R_1$ is energized by a pulse, gate 49-1-1 opens and the content of output counter 45-1-1 is sent to holding memory 44-1-1 as address information. The content of the addressed word of the holding memory is read out and sent to distribution circuit 46-1. Upon receiving it, the distribution circuit 46-1 tests its input highway indication information A and sends its speech path indication information B to its speech path memory of the input highway indicated. For example, when the value of A is 2, speech path indication information B is sent to speech path memory 42-2-1, and the speech path memory is accessed at the address indicated by B for read-out. The information read out appears on common information bus 50-1. As terminal $R_1$ has been energized by the pulse and gate 48-1-1 is kept opening, the read out information is sent out on output highway 41-1-1. A piece of speech path information appearing on an input highway in a clock period is written into its speech path memories at an address indicated by its input counter. The holding memory of an output highway provides an address of a speech path memory that takes out a piece of speech path information required by a speech path of the output highway. Thus, speech path switching between input highways and output highways is carried out with the same principle as that of the conventional switch shown in FIG. 1. As explained above, when terminal $R_1$ is energized by a pulse, the content of a word with a particular address of a particular speech path memory chosen from among speech path memories 42-1-1, 42-2-1, --- 42-k-1, that is, the information contained in a particular speech path of a particular input highway, can be taken out to a speech path indicated by output counter 45-1-1 of output highway 41-1-1. When any one of terminals $R_2$, --- $R_{L'}$, is energized by a pulse, the output operation that takes place is explained in the same way.

As is easily seen, any speech path included in all of the k input highways can be switched to any speech path included in a group of output highways 41-1-1, 41-1-2, --- 41-1-L' via a group of speech path memories 42-1-1, 42-2-1, --- 42-k-1. Concerning any other group of output highways, speech path switching between all of the k input highways and the output highways is carried out without blocking in the same way. Therefore, the switch structure shown in FIG. 4 is equivalent to the conventional switch structure shown in FIG. 1 from a switching capability point of view.

In the structure shown in FIG. 4, the memory speed requirements are given as follows.

n(L'+1) memory operations are required per frame period for a speech path memory, and n memory operations per frame period for a holding memory. That is to say, comparing with the conventional switch shown in FIG. 1, the memory speed requirements are reduced by a factor of (L'+1)/2k for a speech path memory and that of 1/k for a holding memory. Comparing with the switch structure shown in FIG. 2, though the speed requirement for a speech path memory increases by a factor of (L'+1)/2, the number of speech path memories required in this structure is reduced by a factor of 1/L'.

One of the advantages of this invention is that the speed of a speech path memory or a holding memory that is a major element of a switch, can be chosen independently of the total number of its input highways or its output highways (which is k in the structure shown in FIG. 2 and LL' in the structure shown in FIG. 4).

Accordingly, a technical problem of the conventional switch that the maximum speed of its memory elements limits its maximum capacity (a total number of speech paths that can be accommodated in a switch) is solved by the invention where, in principle, any large capacity can be realized by increasing the number of memories connected in parallel.

If a certain capacity is given, a switch with the capacity realized by the invention can use lower speed memories compared with the conventional switch with the same capacity. That is, a switch of the conventional type that is required to use ECL elements with high operational speed and low degree of integration due to their high heat dissipation can be replaced by a switch of this invention where MOS LSI elements with very high degree of integration because of their negligible small heat dissipation can be used. Thus, the invention provides compact, low cost switch structure as compared with those of the conventional type.

From the foregoing it will now be apparent that a new and improved time division speech path switch has been found. It should be understood of course that the embodiments discloses are merely illustrative and are not intended to limit the scope of the invention. Reference should be made to the appended claims, therefore, rather than the specification as indicating the scope of the invention.

What is claimed is:

1. A time division speech path switch in which any speech path in a plurality of input highways can be switched to any desired speech path in a plurality of output highways without blocking any speech path, said switch comprising:

a plurality of speech path memory groups having a plurality of speech path memories corresponding to each output highway, one speech path memory group being provided for each input highway, the number of said speech path memories forming each said speech path memory group being equal to the number of corresponding output highways, each of said speech path memories having a capacity to store at least one frame of information for said input highway;

a plurality of input counters being provided, each input counter being common to all speech path memories in each speech path memory group, each said input counter designating a common address of said speech path memories to store input highway information;

a holding memory provided at each output highway, said holding memory storing information indicating a speech path and indicating an input highway to be read out which corresponds to said speech path of an associated output highway to which the holding memory is coupled;

an output counter for each holding memory provided to designate an address of said holding memory;

said input highway information input on said input highways, said input highway information being stored simultaneously in all of said speech path memories in said speech path memory group into which said input highway information is input; and a switched output signal output on said output highways, said switched output signal being read out of one of said speech path memories, according to the contents of said holding memory.

2. A time division speech path switch according to claim 1, wherein said speech path memory is a MOS memory.

3. A time division speech path switch in which any speech path in a plurality in input highways can be switched to any desired speed path in a plurality of output highways without blocking any speech path, said switch comprising:

each of said output highways being classified into a plurality of sub-groups, each sub-group containing a same number of output highways;

a plurality of speech path memory groups having a plurality of speech path memories corresponding to each output sub-group, one speech path memory group being provided for each input highway, the number of said speech path memories forming each said speech path memory group being equal to the number of sub-groups of output highways, each of said speech path memories having a capacity to store at least one frame of information for said input highway, said output highways of each sub-groups sharing speech path memories in each speech path memory groups;

a holding memory provided at each output highway, said holding memory storing information indicating a speech path and an input highway to be read out which corresponds to said speech path of an associated output highway to which the holding memory is coupled;

an input highway information input in said input highways, said input highway information being stored simultaneously in all of said speech path memories in said speech path memory group into which said input highway information is input; and a switched output signal output on said output highways, said switched output signal being read out of one of said speech path memories, according to the contents of said holding memor 4. A time division speech path switch according to claim 3, wherein said speech path memory is a MOS memory.

* * * * *